Figure 1:
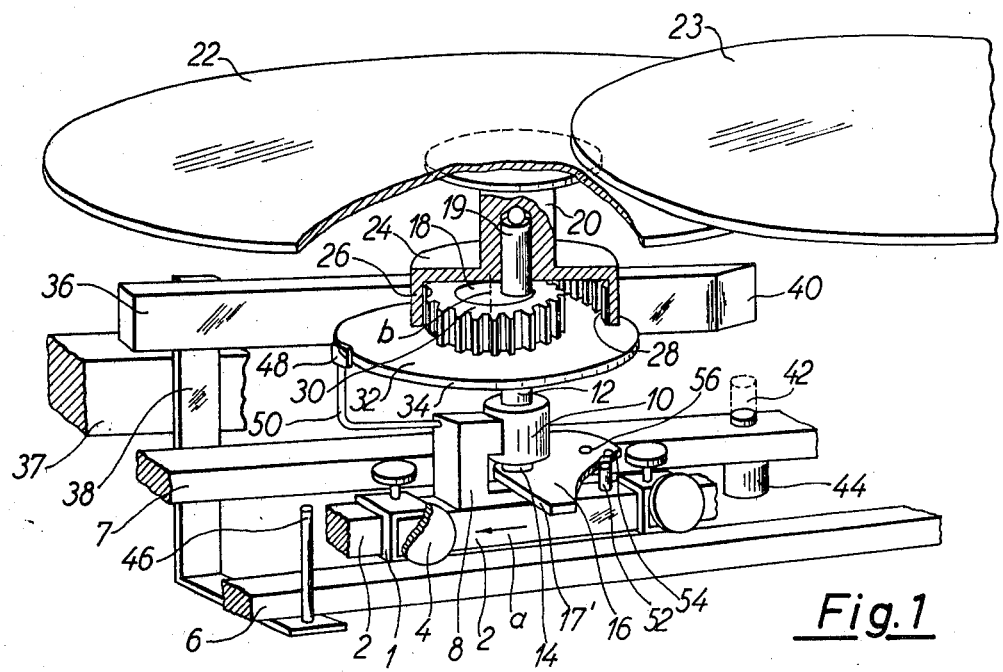

United States Patent [19]

Prydtz

[11] 4,078,649

[45] Mar. 14, 1978

[54] CONVEYOR SYSTEMS

[75] Inventor: Ole Prydtz, Silkeborg, Denmark

[73] Assignee: Kosan Crisplant A/S, Denmark

[21] Appl. No.: 747,337

[22] Filed: Dec. 3, 1976

[30] Foreign Application Priority Data

Dec. 8, 1975 United Kingdom ............... 50198/75

[51] Int. Cl.² .............................................. B65G 43/00
[52] U.S. Cl. .................................... 198/365; 198/796; 198/850
[58] Field of Search ............... 198/365, 366, 370, 802, 198/850-852, 793, 796

[56] References Cited

U.S. PATENT DOCUMENTS

| | | | |
|---|---|---|---|
| 1,475,962 | 12/1923 | Olson | 198/366 |
| 2,808,146 | 10/1957 | Leach | 198/793 |
| 3,231,068 | 1/1966 | Harrison et al. | 198/365 |
| 4,004,681 | 1/1977 | Clewett et al. | 198/365 |

Primary Examiner—Evon C. Blunk
Assistant Examiner—Joseph E. Valenza

Attorney, Agent, or Firm—Craig & Antonelli

[57] ABSTRACT

A sorting conveyor having a row of elements each having an article support face operable to be laterally displaced in a selective manner in response to rotation of a drive shaft. The rotation is transmitted to the shaft through a selectively operable power transfer device provided on each element and including a first pulley for rollingly engaging an elongated rack mounted adjacent one or more unloading stations along the conveyor that has a concentric gear wheel portion, a second pulley is mounted concentrically on the shaft and has a gear wheel portion cooperating with the gear wheel portion of the first pulley. The gear wheel portions are arranged in a planet gear like manner with the first pulley being laterally displaceable between a retracted position out of engagement with said rack and an operative position in which it is engageable therewith and in driving engagement with said second pulley, the displacement of the first pulley being effected by means of a selectively operated actuator means.

5 Claims, 3 Drawing Figures

U.S. Patent   March 14, 1978   4,078,649

CONVEYOR SYSTEMS

The present invention relates to a conveyor system of the type comprising a conveyor chassis and an endless conveyor belt or chain structure operable to receive and convey articles along the chassis past at least one unloading station, said conveyor belt or chain, divided into consecutive sections, being provided with diversion means participating in the movement of the belt or chain and being operable to effect lateral diversion of articles resting on associated surface portions of the belt or chain, said diversion means being drivable by associated driving means including a rotary shaft mounted in a stationary position in the respective belt or chain section so as to extend generally crosswise of the moving direction and cooperating with roller means operable in a selective manner in response to actuation of actuator means adjacent the unloading station to engage rollingly an elongated rack means associated with the unloading station so as to be rotated by the passage of the roller means along the rack means and thereby cause a rotation of said shaft and actuation of said diversion means.

Conveyors of this type, made as chain conveyors comprising an endless train of consecutive article carrier elements, are disclosed in our U.S. Pat. No. 3,912,071 and our copending U.S. patent application Ser. No. 614,941 and are usable as sorting conveyors, the conveyor chain passing a loading station in which articles such as parcels are placed on the carrier elements whereafter the chain moves past a number of unloading stations in which the different articles are selectively unloaded or diverted laterally from the chain according to the individual destinations of the articles.

In said known conveyors each of said carrier elements are provided with laterally movable article support means such as a crosswise arranged conveyor belt or a substantially horizontal disc member, and in both cases the said support means are coupled to said roller means so as to laterally displace and unload the article in response to the roller engaging the said rack means.

The engaging may be established either by moving the elongated rack means parallelly into the roller engaging position or by moving the roller means laterally for engaging the rack. Moving the elongated rack may cause certain problems and it is therefore preferred to use the latter arrangement for producing the driving rotation of said shaft and more specifically the invention relates to this preferred arrangement.

The invention seeks to provide a conveyor system in which the driving engagement between the rack and the roller means may be established in a simple manner by means of a simple and robust arrangement.

According to the invention there is provided a conveyor system of the type referred to, in which said roller means comprise two annular members, of which a first constitutes the said rack engaging roller, shaped with an outer periphery as a pinion or pulley for drivingly engaging the rack means and arranged so as to be laterally displaceable between an inoperative position retracted from the rack means and an operative position in which it is engageable with the rack means, and provided with a concentric annular drive portion, while the second of said annular members is mounted concentrically on said shaft in the same plane as that defined by said concentric drive portion of the first annular member, said drive portion and said second annular member having different diameters whereby one of them is located generally inside the other in such a manner that when the rack engaging roller is displaced into its operative position its associated concentric drive portion is in driving engagement with an annular portion of said second annular member.

In a preferred embodiment the two annular members are arranged in a permanent eccentric relationship, as in a planet gear, so as to be in constant drive connection with each other irrespective of the lateral position of the displaceable member.

Figure 2:
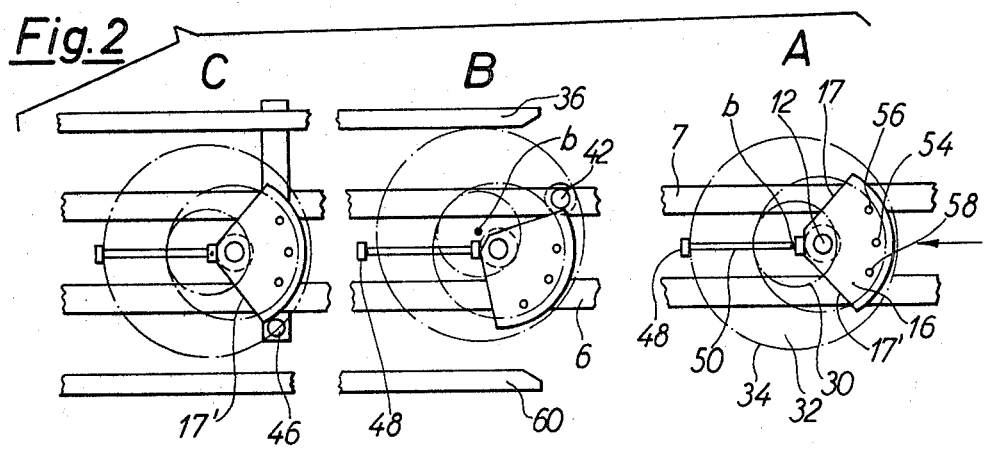
Figure 3:
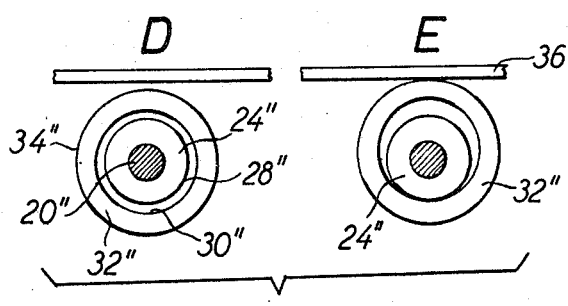

In the following the invention will now be described in more detail with reference to the accompanying drawing in which FIG. 1 is a sectional perspective view of a carrier element at an unloading station of a conveyor system according to the invention, FIG. 2 is a diagrammatic representation of three different positions of the carrier element as seen from above, and FIG. 3 is a schematic top view of a modified arrangement of the annular driving members.

FIG. 1 shows a conveyor chain 1 made of link members each having a body 2 provided with rollers 4 so as to be guidingly movable along two diagonally arranged conveyor rails 6 and 7. The chain 1 is an endless chain which is movable along the rails 6 and 7 and passes suitable sprocket means (not shown). On the link body 2 there is mounted a bracket 8 holding a bearing 10 in which a shaft 12 is journalled in substantially vertical position. The lower end portion 14 of the shaft is projecting downwardly from the bearing 10 and provided with an actuator plate member 16 for turning the shaft in the bearing as described below with reference to FIG. 2. Above the bearing 10 the shaft 12 has as an integrated part an eccentric crank disc 18 and at the upper end 19 of the shaft 12 there is rotatably mounted a hub 20 constituting a driving shaft for an article carrier disc 22; a similar disc of a following conveyor link is indicated at 23 partly overlapping the disc 22. The hub 20 is provided with a flange 24 having a downwardly projecting concentric flange or annular member 26 furnished with internal toothing 28. Inside the annular member 26 and journalled on the eccentric crank disc 18 is provided a gear wheel 30 engaging a portion of the internal toothing 28 and having a diameter smaller than the inner diameter of the internal toothing 28 as shown in the drawing. Concentrically and in rigid connection with the gear wheel 30 is mounted a friction disc member 32 the rim surface 34 of which is adapted for frictional engagement with an elongated rack 36 as described below with reference to FIG. 2. The rack 36 is mounted to a conveyor frame 37 by means of a bracket 38 which also supports the rails 6 and 7 and the rack is mounted substantially parallelly to the moving path of the conveyor links. The general movement direction is indicated by an arrow $a$ and as seen in this direction the rack 36 has a front end portion 40 which is shaped for a gradual engagement with the friction disc 32. On the rail 7 near said rack front end portion 40 is mounted an actuator pin 42 which, by means of a working cylinder 44, is shiftable between a lower, retracted inoperative position and — as shown in dotted lines — a raised, operative position. A fixed deactuator pin 46 is mounted on the bracket 38 near the other end of the rack 36 and a fixed braking block 48 is mounted on the bracket 8 by means of a rigid arm 50 for cooperating with the disc 32 as described below.

It will be understood that the disc 22, the hub 20, the flange 26, the shaft 12 and the actuator plate 16 are all concentrically rotatable about the same axis and that the gear wheel 30 and the disc member 32 are concentrically rotatable about a center axis, indicated by the dot and dash line b, of the eccenter disc 18 while the gear wheel 30 engages the internal toothing 28 at an area diametrically opposed to the axis of the shaft 12. Thus, when the shaft 12 is turned some degrees clockwise, e.g. by turning the actuator plate 16, the center axis b of the eccenter disc 18 is moved correspondingly about the axis of the shaft and thereby the engagement area will be moved to another portion of the toothing 28 in the clockwise direction if the disc 22 and the associated parts are held steadily during the turning of the shaft, and at the same time the gear wheel and thereby the disc will be displaced along a curve laterally towards the rack 36 until the rim portion 34 can engage this. By moving the chain, and thereby the disc 32, along the rack the disc 32 will then be rotated, whereby the gear wheel 30 will rotate the system 26,24,20,22 for unloading an article resting on the upper disc 22.

The system may be returned to its initial position simply by turning the shaft 12 the other way, and the braking block 48 is arranged so as to brakingly engage and hold the rim portion of the disc 32, whereby the disc 22 is prevented from rotating e.g. when being loaded with another article to be conveyed.

FIG. 2 shows schematically from the right to the left three different positions of a conveyor link during its passing the unloading location at the rack 36 as seen from above, and the general moving direction is indicated by the arrow shown. For reasons of clarity certain details from FIG. 1 are left out. The interengageable portions of the gear wheel 30 and the toothing 28 are represented by the dot-and-dash lined circles 30' and 28', respectively, and the rim portion 34 is represented by the dot-and-dash-lined circle 34'. Furthermore the figure shows the rails 6 and 7 and at position B and C the rack 36 and the respective actuator and deactuator pins 42,46. A second rack 60 is provided symmetrically opposed to the rack 36 for effecting unloading to the other side as described below. At position A the arrangement is held in the braked inoperative position, the axis b of the disc member 32 being situated midways between the racks 36,60 and the braking block engaging the rim 34'. In this position the actuator plate member 16 is held symmetrically about the midline through the shaft 12 midways between the rails. The actuator plate 16 has two tapering side portions 17 and 17' and as shown at B the actuator plate has been turned some degrees clockwise about the axis of the shaft 12 by slidingly abutting the raised actuator pin 42 on the rail 7. By this turning the rim 34 is brought into engagement with the rack 36 for effecting the unloading during the further movement along the rack, and at the same time the rim is released from the braking engagement with the block 48 as mentioned above. At C the system is brought back to the initial position by means of the actuator plate 16 having slidingly abutted the deactuator pin 46 by its side portion 17', whereafter the disc 22 may be loaded again. In a corresponding manner the rim 34' may be rotated anticlockwise by means of the rack 60 when additional actuator pins (not shown) are provided in respective opposite positions.

In order to define the positions of the disc member 32 the actuator plate 16 is provided with cavities 54,56,58 placed on a circle line about the axis of the shaft so as to be releasably engaged by a spring loaded ball lock device 52, shown in FIG. 1, in the respective positions.

FIG. 3 shows schematically a modified, inversed arrangement according to the invention in which the disc member 32 and the gear wheel have been substituted by an outer annular member 32" having a rack engageable rim portion 34" and a concentric inner surface portion 30" engageable with an outer drive portion 28" of a pulley 24" on the shaft 20" of the disc 22. In the operative position shown at D the members 32", 24" are mutually disengaged and when the annular member 32" is displaced by suitable actuator and guiding means (not shown) into the operative position, as shown at E a driving connection is established between the members 32" and 24" as well as between the annular member 32" and the rack 36.

The lock means 52 and the cavities 54,56 could be placed elsewhere e.g. between the bearing 10 and the shaft end portion 12 or even omitted by a suitable rate of friction in the bearing 10, and in that case the actuator plate member could be substituted by a simple actuator arm member mounted on the shaft end 14 and bent to provide the surfaces 17 or 17' for sliding engagement with the actuator pins 42,46. The outer side portions of the actuator plate could also be provided with e.g. horizontal contact rollers to be engaged by selectively operable cam plate members substituting the actuator pins.

It will be appreciated that the invention is not restricted to be used in connection with conveyors of the disc type shown, since the mechanism might be used as well, when suitably adapted, for rotating e.g. a horizontal shaft for driving a conventional cross conveyor belt or any other corresponding unloading means.

What is claimed is:

1. A conveyor system comprising a conveyor chassis and an endless conveyor belt or chain structure operable to receive and convey articles along the chassis past at least one unloading station, said conveyor belt or chain, divided into consecutive sections, being provided with diversion means participating in the movement of the belt or chain and being operable to effect lateral diversion of articles resting on respective associated surface portions of the belt or chain, said diversion means being drivable by associated driving means including a rotary shaft mounted in a stationary position in the respective belt or chain section so as to extend generally crosswise of the main moving direction and cooperating with roller means operable in a selective manner in response to actuation of actuator means adjacent the unloading station to engage rollingly an elongated rack means associated with the unloading station so as to be rotated by the passage of the roller means along the rack means and thereby cause rotation of said shaft and actuation of said diversion means, characterized in that said roller means comprise two annular members, of which a first constitutes the said rack engaging roller, shaped with an outer periphery as a pinion or pulley for drivingly engaging the rack means and arranged so as to be laterally displaceable between an inoperative position retracted from the rack means and an operative position in which it is engageable with the rack means, and provided with a concentric annular drive portion, while the second of said annular members is mounted concentrically on said shaft in the same plane as that defined by said concentric drive portion of the first annular member, said drive portion and said second annular member having different diameters whereby one of them is located generally inside the other in such a manner that when the rack engaging roller is displaced into its operative position its associated concentric drive portion is in driving engagement with an annular portion of said second annular member.

2. A conveyor system according to claim 1, characterized in that said first annular member is rotatably mounted on crank means eccentrically swingable about the axis of said shaft so as to be in constant driving engagement with said second annular member when the first annular member is moved laterally to and from its operative position by swinging of said crank means.

3. A conveyor system according to claim 2, characterized in that each belt or chain section is provided with a stationary braking member cooperating with the periphery of said first annular member so as to brake the same against rotation when it assumes its inoperative position.

4. A conveyor system according to claim 2, characterized in that said crank means are connected with abutment means operable to cause rotation of the crank means in response to said abutment means being displaced by abutting against selectively actuated actuator means at said unloading station.

5. A conveyor system according to claim 2, in which the crank means is constituted by an eccentric portion on a second shaft held reciprocably rotatably by the respective belt or chain section in alignment with the axis of said first shaft, an outer portion of said second shaft being designed as a bearing for said first shaft, and said second annular member being arranged on the first shaft adjacent said bearing so as to surround the first annular member having an interior rim surface in driving engagement with the outer periphery of the drive portion of the first annular member.

* * * * *